United States Patent
Beeston et al.

(10) Patent No.: US 7,991,758 B2
(45) Date of Patent: Aug. 2, 2011

(54) SYSTEM AND METHOD FOR PERFORMING A SEARCH OPERATION WITHIN A SEQUENTIAL ACCESS DATA STORAGE SUBSYSTEM

(75) Inventors: Ralph T. Beeston, Tucson, AZ (US); Paul M. Greco, Tucson, AZ (US); Michael R. Noel, Tucson, AZ (US); Cory G. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1729 days.

(21) Appl. No.: 11/221,089

(22) Filed: Sep. 7, 2005

(65) Prior Publication Data

US 2007/0055831 A1 Mar. 8, 2007

(51) Int. Cl.
*G06F 17/30* (2006.01)
(52) U.S. Cl. ........ 707/707; 707/706; 707/709; 707/767; 707/779
(58) Field of Classification Search .......... 707/705–712, 707/724–725, 741–746, 770, 778, 767, 779; 711/104–105; 706/45–50; 709/215–220
See application file for complete search history.

(56) References Cited

U.S. PATENT DOCUMENTS

| | | | |
|---|---|---|---|
| 4,125,868 A | | 11/1978 | Hruby et al. |
| 4,543,626 A | | 9/1985 | Bean et al. |
| 4,929,946 A | | 5/1990 | O'Brien et al. |
| 5,146,561 A | | 9/1992 | Carey et al. |
| 5,159,336 A | | 10/1992 | Rabin et al. |
| 5,237,553 A | * | 8/1993 | Fukushima et al. ....... 369/53.17 |
| 5,454,098 A | * | 9/1995 | Pisello et al. .................. 703/24 |
| 5,519,861 A | * | 5/1996 | Ryu et al. .............................. 1/1 |
| 5,809,516 A | * | 9/1998 | Ukai et al. ..................... 711/114 |
| 5,875,448 A | | 2/1999 | Boys et al. |
| 5,903,867 A | * | 5/1999 | Watari et al. .................. 704/270 |
| 5,930,805 A | * | 7/1999 | Marquis ................................ 1/1 |
| 6,021,409 A | * | 2/2000 | Burrows ............................... 1/1 |
| 6,029,195 A | * | 2/2000 | Herz ............................ 725/116 |
| 6,055,530 A | * | 4/2000 | Sato ..................................... 1/1 |

(Continued)

FOREIGN PATENT DOCUMENTS

EP      1703426     * 9/2006

(Continued)

OTHER PUBLICATIONS

Chinese Office Action from application No. 200680032463 mailed on Feb. 12, 2010.

(Continued)

*Primary Examiner* — Srirama Channavajjala
(74) *Attorney, Agent, or Firm* — Zilka-Kotab, PC

(57) ABSTRACT

A system and method for performing a search operation within a sequential access data storage subsystem are disclosed. According to one embodiment, a data storage subsystem is provided which comprises a search module and a communication channel interface to communicatively couple the data storage subsystem to a host data processing system via a communication channel. In the described embodiment, the search module is configured to receive search attribute data from the host data processing system via the communication channel interface, where the search attribute data specifies a search attribute. The search module is further configured to perform a search operation on data of a sequential access storage element utilizing the search attribute and to provide search result data to the host data processing system via the communication channel interface in response to a performance of the search operation.

38 Claims, 5 Drawing Sheets

U.S. PATENT DOCUMENTS

| | | | |
|---|---|---|---|
| 6,055,535 A * | 4/2000 | Suzuoka et al. | 1/1 |
| 6,317,371 B2 * | 11/2001 | Katayama et al. | 365/200 |
| 6,397,209 B1 * | 5/2002 | Reed et al. | 1/1 |
| 6,539,459 B1 | 3/2003 | Tadokoro et al. | |
| 6,651,070 B1 * | 11/2003 | Hirashima et al. | 1/1 |
| 6,763,382 B1 | 7/2004 | Balakrishnan et al. | |
| 6,886,021 B1 | 4/2005 | Pal et al. | |
| 2002/0002552 A1 * | 1/2002 | Schultz et al. | 707/3 |
| 2002/0055920 A1 * | 5/2002 | Fanning et al. | 707/3 |
| 2002/0072981 A1 * | 6/2002 | Park et al. | 705/26 |
| 2002/0083062 A1 * | 6/2002 | Neal et al. | 707/10 |
| 2002/0169764 A1 * | 11/2002 | Kincaid et al. | 707/3 |
| 2003/0050980 A1 | 3/2003 | Dutta et al. | |
| 2004/0054662 A1 * | 3/2004 | Dworkis et al. | 707/3 |
| 2004/0255091 A1 | 12/2004 | Justo et al. | |
| 2005/0076016 A1 | 4/2005 | Mihai et al. | |
| 2005/0198068 A1 * | 9/2005 | Mukherjee et al. | 707/104.1 |
| 2006/0136570 A1 * | 6/2006 | Pandya | 709/217 |

FOREIGN PATENT DOCUMENTS

| | | | |
|---|---|---|---|
| WO | WO 2005/091825 | * | 10/2005 |
| WO | WO 2007/028705 | * | 3/2007 |

OTHER PUBLICATIONS

Applicants response to the European Patent Office for application No. 06778317.5-1527 filed on Jun. 12, 2009.

* cited by examiner

SYSTEM AND METHOD FOR PERFORMING A SEARCH OPERATION WITHIN A SEQUENTIAL ACCESS DATA STORAGE SUBSYSTEM

BACKGROUND

1. Technical Field

Embodiments of the present invention relate generally to data storage and management and more particularly to a system and method for performing a search operation within a sequential access data storage subsystem.

2. Description of Related Art

As data processing systems and communications networks have become more prevalent, the need to store, organize, and utilize data produced by such systems and communicated over such networks more efficiently has increased. One mechanism for storing, providing access to, and processing such data is the data storage subsystem. A data storage subsystem includes an integrated collection of storage controllers and/or host bus adapters, storage elements, and any required control software used to provide data storage services to one or more host data processing systems.

Conventional storage elements include machine-readable media which may be fixed, removable, magnetic, optical, random/direct access, and/or sequential access (e.g., fixed disks, CD/DVD-ROMs, tapes, solid state memory, or the like) as well as media loaders and robots utilized to access such media. As originally implemented, data storage subsystems included reliable, relatively high-capacity and inexpensive sequential access storage elements (e.g., tape). Such sequential access-based data storage subsystems were, and continue to be, used primarily for data backup and archive operations. More recently, data storage subsystems have been implemented using disk drive storage providing greater access speed and flexibility of use while increasing cost and/or decreasing reliability.

In addition to traditional use for data backup and archiving, disk drive-based data storage subsystems have been utilized to provide data replication services for data processing system clusters, failover/disaster-recovery, testing, data mining and analysis, and the like. While sequential access storage element-based data storage subsystems may be used to provide some or all of the described enhanced data storage and processing services, existing systems rely on host data processing system-controlled or performed input/output (I/O) operations (e.g., read and write operations). Such host I/O operations consume a great deal of host data processing system-to-data storage subsystem communication channel bandwidth and host data processing system resources (e.g., processing elements, memory, or the like) to perform search operations as well as for otherwise unnecessary system overhead (e.g., application, driver, and/or operating system software).

SUMMARY

A system and method for performing a search operation within a sequential access data storage subsystem are provided. According to one embodiment, a data storage subsystem is provided which comprises a communication channel interface to communicatively couple the data storage subsystem to a host data processing system via a communication channel and a search module. In the described embodiment, the search module is configured to receive search attribute data from the host data processing system via the communication channel interface, where the search attribute data specifies a search attribute. The search module is further configured to perform a search operation on data of a sequential access storage element utilizing the search attribute and to provide search result data to the host data processing system via the communication channel interface in response to a performance of the search operation.

According to a second embodiment of the present invention, received search attribute data specifies a maximum search time duration and the previously-described search module is configured to perform a search operation for a time period which is less than or equal to the maximum search time duration.

According to a third embodiment of the present invention, received search attribute data specifies a maximum number of logical blocks and the data of the previously-described sequential access storage element is stored utilizing a plurality of logical blocks. In the described embodiment, the search module is configured to perform the previously-described search operation on a number of logical blocks of the plurality of logical blocks which is less than or equal to the maximum number of logical blocks.

According to a fourth embodiment of the present invention, provided search result data comprises data which specifies a logical block of the previously-described plurality of logical blocks.

According to a fifth embodiment of the present invention, received search attribute data specifies a user-selected search attribute. In the described embodiment, the search module is configured to perform the previously-described search operation utilizing the user-selected search attribute and at least one default search attribute.

According to a sixth embodiment of the present invention, received search attribute data specifies a search term and a sequential search type and the previously-described search operation is associated with a current logical position within the data of the sequential access storage element. In the described embodiment, the search module is configured to provide data which specifies an occurrence of the search term within the data of the previously-described sequential access storage element, where the occurrence of the search term is sequentially adjacent to the described current logical position.

According to a seventh embodiment of the present invention, received search attribute data specifies a search term and a summary search type. In the described embodiment, the search module is configured to provide data which specifies one or more occurrences of the search term within the data of the previously-described sequential access storage element.

According to an eighth embodiment of the present invention, received search attribute data further specifies a maximum number of search results. In the described embodiment, the search module is configured to provide data which specifies a number of occurrences of the search term within the data of the previously-described sequential access storage element which is less than or equal to the maximum number of search results.

According to a ninth embodiment of the present invention, received search attribute data specifies a search term and the previously-described search operation comprises a passive search operation. In the described embodiment, the search module is configured to perform the passive search operation in response to a receipt of a request to perform an input/output operation on the previously-described sequential access storage element, and further configured to provide first data which specifies an occurrence of the search term within the data of the previously-described sequential access storage element and second data which specifies a response to the request to perform the input/output operation.

According to a tenth embodiment of the present invention, the previously-described data storage subsystem further comprises a buffer storage element to store a portion of the data of the previously-described sequential access storage element in response to the receipt of the previously-described request to perform the input/output operation. In the described embodiment, the search module is configured to perform the previously-described passive search operation on the portion of the data of the previously-described sequential access storage element stored within the buffer storage element.

According to an eleventh embodiment of the present invention, the previously-described search module is configured to perform an active search operation in response to a receipt of a request to perform the active search operation on the data of the previously-described sequential access storage element.

According to a twelfth embodiment of the present invention, the previously-described search module comprises a hardware processing element. In the described embodiment, the search module is configured to perform a primary search operation on the data of the previously-described sequential access storage element utilizing the hardware processing element and to provide the search result data to search module software within the previously-described host data processing system where the search module software is configured to perform a secondary search operation utilizing the search result data.

In yet another embodiment of the present invention, a method is provided which comprises presenting a data storage subsystem search user interface and receiving search attribute data from a user via the data storage subsystem search user interface. In the described embodiment, the received search attribute data is provided to a data storage subsystem which comprises a search module and a sequential access storage element. The described embodiment further comprises receiving search result data from the data storage subsystem in response to a provision of the search attribute data to the data storage subsystem.

While the term "user" has been utilized herein in the description of one or more embodiments of the present invention, a "user" as used herein is not intended to be limited to an actual person. Rather, the term "user" within the present description is intended to indicate any logical or physical entity capable of requesting, issuing, controlling, or consuming or utilizing the results of a search operation. Consequently, in various embodiments of the present invention a "user" may include a human operator, a credential or identity associated with such a human operator, a host or system application program, operating system element, or the like).

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in software, hardware, (e.g., an ASIC and/or special purpose electronic circuit), or a combination including software and hardware. Changes and modifications such as those described may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION OF AN ILLUSTRATIVE EMBODIMENT

Figure 1:
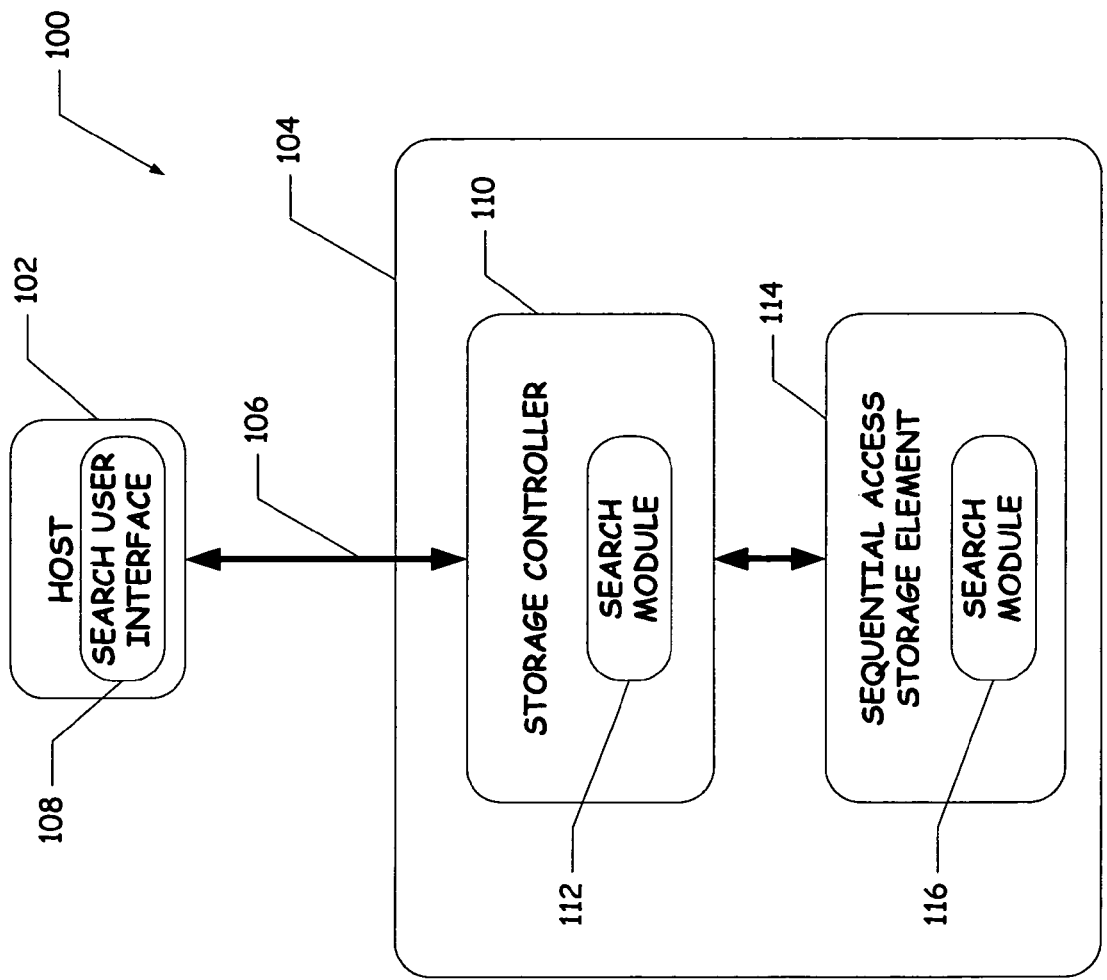
FIG. 1 illustrates a high level block diagram of a data storage network including a data storage subsystem according to an embodiment of the present invention.

The following sets forth a detailed description of at least the best contemplated mode for carrying out the one or more systems, devices and/or processes described herein. The description is intended to be illustrative and should not be taken to be limiting.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention provide systems and methods for performing search operations within a sequential access data storage subsystem such as the 3592 Enterprise Tape System provided by International Business Machines Corporation of Armonk, N.Y. Other sequential access data storage subsystems may include hierarchical storage management systems (HSMs) including logical or physical sequential access storage elements, virtual tape storage subsystems such as the 3494 Virtual Tape Server also provided by International Business Machines Corporation and/or other linear, implicit address-based (e.g., sequential) storage elements or devices. Such embodiments provide an interface, method, and storage subsystem which allow a search to be performed on an individual record basis at a host data processing system on data records within a remote sequential (e.g., tape) data storage element containing specific data content without requiring the host to request (e.g., read) and/or process (e.g., search or parse) for the data content. Consequently, host data processing system resources (e.g., processor cycles, memory, or the like) as well as host data processing system-to-data storage subsystem communication channel bandwidth are conserved and the overall speed with which search operations may be performed is increased as compared with conventional systems and methods. For example, using one or more of the described system and method embodiment, the time needed to perform sequential access data processing involving one or more search operations was reduced from 54 hours to 7.5 hours.

According to one embodiment of the present invention, a data storage subsystem is provided. A data storage subsystem comprises any system or arrangement provided primarily for the purpose of providing persistent data storage and/or access. A data storage subsystem may comprise any number of storage resources including one or more individual (e.g., a single disk drive, tape drive, or the like) and/or aggregating (e.g., disk or tape array systems, robotic tape libraries, filers, filer servers, or the like) storage elements or appliances, as well as any associated storage controllers, adapters, interfaces, control software, or the like. In the described embodiment, a data storage subsystem is provided which includes at least a search module and a communication channel interface to communicatively couple the data storage subsystem to a host data processing system via a communication channel (e.g., ESCON, FICON, Fibre Channel, SCSI, or the like).

In the described embodiment, the search module is configured to receive search attribute data, which specifies a search attribute, from a host data processing system via the communication channel interface, and is further configured to perform a search operation on data of a sequential (e.g., tape) storage element utilizing the search attribute and to provide search result data to the host data processing system via the communication channel interface in response to the search operation being performed. In one embodiment, the search module comprises a special-purpose hardware processing element (e.g., an application-specific integrated circuit or "ASIC") utilized to provide data flow control and management.

The described search module may be implemented within a separate storage controller device of a data storage subsystem such as the IBM TotalStorage Enterprise Tape Controller 3592 Model J70 or provided integrally with a storage element or device thereof such as the IBM TotalStorage Enterprise Tape Drive 3592, both provided by International Business Machines Corporation. Similarly, a search module may be implemented as a discrete physical element as previously-described (e.g. a data flow processing module or element), or as functionality incorporated into an existing control unit/controller of a storage controller or element.

In the described embodiment, search attribute data, and consequently a search attribute, may comprise any data related to or utilized in the performance of, a data search operation. For example, in one embodiment, a search attribute specifies one or more search terms (i.e., the actual data to be searched for), search term format(s) (e.g., ASCII data format, EBCDIC data format, binary data format or the like), and/or search term operators, thus forming a search term expression to be utilized during a search operation. In one or more other embodiments, search attribute data may specify one or more "limit condition"-type search attributes specifying how, or according to which, a search operation may be limited.

Utilizing a "limit condition"-type search attribute, a search operation may be limited in any of a number of ways. According to one exemplary embodiment, a maximum search time duration or "timeout" (e.g., 30 minutes) search attribute is specified. In the described embodiment, a search operation is performed for a period of time that is less than or equal to the specified maximum search time duration. In another embodiment, a search attribute may be specified which indicates an amount of data (e.g., a number of bits, bytes, words, extents, strings, files, records, blocks, pages, or the like) of a sequential access storage element to be searched using a search operation. In the described embodiment, a search operation is performed on an amount of data equal to or less than that specified by a corresponding search attribute. For example, a search operation may be limited to a segment of data which is logically or physically contiguous with a position (e.g., a "current" logical block or data position) within the data to be searched which is associated with search request receipt, initiation, or the like.

Utilizing such "limit condition" search attributes, an interface or data storage subsystem as described herein is provided with a mechanism by which the duration of a search operation may be controlled. In another embodiment, an alternative search duration control mechanism is provided in which each requested search operation is periodically suspended, providing an opportunity for a requesting user to determine the status or progress, if any, of the requested search and to indicate whether or not the search operation should be continued. Such mechanisms as have been described may be of particular use in conjunction with technologies which fail to provide an elegant technique to interrupt and/or stop the operation of a data storage subsystem or storage element once a command has been initiated or requested. Without such mechanisms in a SCSI-based data storage subsystem, for example, a requested search operation may continue to be performed over an extended period of time (e.g., hours or even days) without the generation of useful result data and/or where the search operation itself has become trivial.

In one embodiment of the present invention, whenever any limit condition search attribute is reached/detected a search operation is concluded or modified, rendering the other limit condition search attributes specified, if any, inoperative. For example, a search operation may be performed for less than the specified maximum search time duration if the final logical block a search attribute-specified amount of data to be searched is reached. Moreover, a search attribute-specified limit condition may be rendered inoperative for any of a variety of other reasons, for example, once the final logical block of an entire sequential access storage element to be searched, irrespective of any maximum number of logical blocks specified.

In still other embodiments of the present invention, a search attribute and/or search attribute data may be utilized to specify other aspects of how a search operation is to be performed (e.g., the "type" of search to perform). For example, in one embodiment of the present invention a search attribute may be provided which indicates which of a sequential search type and a summary search type is to be performed. In a sequential or "positional" search operation, search results are requested in context to their position with respect to a "current" logical block or data position within the data to be searched which is associated with search request receipt, initiation, or the like. For example, a search may be requested to locate the "next" occurrence or "next" three occurrences of a specified search term. Similarly, a search may be requested to locate an immediately preceding or "previous" occurrence of a specified search term. It should therefore be appreciated that a "directional" search attribute may be specified via the search type to be performed. Alternatively, data specifying such a search direction may be specified separately using an additional or alternative search attribute. According to one embodiment, a sequential search type is provided as a modification of a conventional "space" command utilized in conjunction with a data storage subsystem or data storage element in which a user designates a number of logical blocks to advance within a sequential access storage element until one or more specified search terms and/or expressions are reached.

In a summary or "match list"-type search operation by contrast, search results are requested without respect to their relative position with respect to a "current" logical block or data position. In the described search type, a summary of search results which "match" a specified search term or expression are presented. Such results may be presented sequentially, beginning with the first search term or expression "match" within the sequential access storage element data to be searched or may be organized based upon any of a number of criteria (e.g., accuracy of match where a "fuzzy" search operation is performed, search result "rank", or the like). As will be described further herein, all search results "matching" a specified search term or expression may be presented or alternatively the number of search results presented may be reduced.

In still another embodiment of the present invention, a "search-type" search attribute is provided which indicates which of a passive search operation and an active search operation is to be performed. A passive or "passively performed" search operation according to one embodiment of the present invention is a search operation which is performed in conjunction with the performance of another operation, such as an actively or explicitly requested (as well as separate and distinct) input/output (I/O) operation. Prior to the performance of a passive search operation, a user specifies one or more search terms or expressions. Thereafter, a search operation is performed in response to a request to perform an unrelated I/O or other operation (e.g., a read or write) and search result data is in turn provided in conjunction with a response, if any, to the request.

According to one embodiment, a passive search operation is performed in conjunction with an HSM "migrate" or post-migrate "audit" function in which data is stored (e.g., written, copied, or transferred) from direct-access hard disk drive storage elements to one or more sequential (e.g., tape) data storage elements and subsequently verified. In the described embodiment a known record tag is searched for to identify the location of each file to which data has been written. Data stored at each "tagged" file location on a sequential data storage element may then be compared to data migrated from disk storage for verification purposes.

In alternative embodiments of the present invention, a passive search may be performed on only the actual data of the I/O operation (e.g., a particular data word being read or written) or alternatively, where a cache or spatial locality-type (e.g., read-ahead) buffer is employed, a passive search operation may be performed on data which is stored logically or physically adjacent to such I/O operation data and made accessible (e.g., buffered along with the data to be read) by virtue of the requested I/O operation and the described buffer. An active search operation, by contrast, is a search operation performed in response to an explicit or active search request by a user (e.g., made or initiated via a data storage subsystem search user interface). Such an active search operation request may be embodied within any of a number of formats (e.g., modification of an existing command, generation of a new data storage subsystem command, diagnostic function, or the like).

Once a search operation has been performed according to one or more user-specified search attributes, search result data may be provided. Search result data, as described herein, may comprise any data related to or indicating a result of a search operation. According to one embodiment of the present invention, a search operation is performed at a record (i.e., logical block) or higher granularity (e.g., extent, word, byte, or the like) level. In one embodiment, search result data is provided as data which specifies a particular logical block within the data to be searched at which a specified search term or expression was identified. Search result data may additionally or alternatively include other data further identifying or specifying a search result, hit, and/or search term/expression occurrence. For example, in one embodiment, a search result number or identifier may be provided or specified. In another embodiment of the present invention, search result data may comprise an excerpt of data to be searched which includes a search term or expression occurrence to provide search result context.

As previously described herein, a search attribute may be specified utilizing search attribute data which indicates a maximum number of search results to return and/or to present. Such a search attribute may be applied to a search operation directly (i.e., causing the search operation to cease once a specified number of search results are identified) and/or to the provision of search result data (i.e., causing a specified number of a larger number of identified search results to be provided/presented to a user). Where a subset of search results is to be provided as search result data, a selection of search results to present may be made based upon any of a number of criteria (e.g., sequential order, accuracy of search result match, relevance, or the like).

According to yet another embodiment, search result data may be provided as part of a bifurcated process. In the described embodiment, a first or "primary" search operation is performed locally within a sequential access data storage element and/or locally to a sequential access data storage subsystem, thereby causing search result data to be generated and provided to a physically remote host data processing system. Thereafter in the described embodiment, a secondary or "extended" search operation is performed locally to the host data processing system on the received search result data. In one embodiment, such a bifurcated search process is performed by automatically abridging or modifying a user-specified search term or expression to configure the described primary search operation in response to the receipt of a search operation request as well as generating data which specifies the secondary search operation definition and providing such data to a host data processing system application.

Utilizing the described bifurcated search process, a coarse-granularity primary search operation may be performed utilizing dedicated hardware (e.g., a hardware processing element search module), thereby enabling host data processing system software to perform a finer-granularity secondary search operation as needed and consequently reducing search module hardware and data storage subsystem complexity while enabling the ability to perform more complex search operations utilizing some host data processing system functionality and reducing the burden on host data processing system resources as compared with conventional storage systems.

According to another embodiment of the present invention, search attribute data is provided in conjunction with a passive or active search operation request which includes one or more user-selected search attributes or parameters as well as metadata which indicates which of a plurality of search attributes have been user-selected and specified and which of the plurality of search attributes are to be utilized with a predetermined default search attribute value or disregarded. In the described embodiment, a search operation is performed by identifying user-selected search attributes utilizing the described metadata and configuring a search operation utilizing received search attribute data which corresponds to those search attributes which have been so identified. According to one embodiment of the present invention metadata includes a plurality of "apply" bits, each of which corresponds to one of a plurality of potential search attributes.

If an apply bit associated with or corresponding to a search attribute stores a first predetermined value (e.g., has a logical value of "1" or is "set") then the search attribute is deemed to be user-selected and the attribute's user-specified value is determined from received search attribute data and "applied" or utilized in the performance of one or more search operations. By contrast, if an apply bit associated with or corresponding to a search attribute stores a second predetermined value (e.g., has a logical value of "0" or is "cleared") then the search attribute has not been user-selected and a predetermined default search attribute value is "applied" or utilized.

In addition to simplifying the configuration of basic or commonly-performed search operations while facilitating the configuration of more complex or specialized searches utilizing all available search attributes, the use of apply bits or other default search attribute mechanisms may have a number of useful benefits. For example, host data processing system-to-data storage subsystem communication channel bandwidth utilization is reduced as known search attribute values need not be transmitted between host and storage. Moreover, the accuracy of search attribute values utilized may be increased as inadvertent search attribute value modifications are not propagated or applied at a data storage subsystem unless corresponding metadata (e.g., an apply bit) indicates that such an application or propagation is desired. Similarly, search attribute data may be initialized to include default search attribute values such that an inadvertent modification of metadata will not typically result in a modification of the actual search attributes applied during a search operation unless a corresponding inadvertent change in search attribute data is made.

While a number of specific exemplary search attributes have been described herein for purposes of illustration, any of a number of other search attributes and/or search attribute data formats may be utilized in alternative embodiments. In one alternative embodiment for example, a search attribute is employed which specifies a logical block or record offset (e.g., an offset number of bytes) within each logical block to be searched at which to begin each search operation. Similarly, logical block or "record" size flexibility may be provided utilizing a search attribute which specifies a logical block length (e.g., in bytes) where the smaller of actual logical block length and the search attribute indicated value is utilized and a predetermined value (e.g., logical value "0") is utilized to indicate spanning blocks. In another embodiment, search attribute data may be used to indicate how non-data (e.g., file marks, tape marks, or the like) are to be processed during a search operation.

FIG. 1 illustrates a high level block diagram of a data storage network including a data storage subsystem according to an embodiment of the present invention. In the depicted data storage subsystem 100, a host data processing system 102 is coupled to a data storage subsystem 104 (e.g., a tape data storage subsystem) via a communication channel 106 (e.g., ESCON, FICON, Fibre Channel, SCSI, or the like) as shown. In the embodiment of FIG. 1, host data processing system 102 comprises a data storage subsystem search user interface 108 utilized to receive search attribute data from a user, provide received search attribute data to data storage subsystem 104, to receive search result data from data storage subsystem 104, and to present received result data to a user.

Data storage subsystem 104 of the illustrated embodiment includes a sequential (e.g., tape) access storage element 114 including a search module 116 coupled to host data processing system 102 via a storage controller 110 as shown. In the illustrated embodiment, search module 116 is utilized to receive search attribute data specifying at least one search attribute from host data processing system 102 via communication channel 106 and storage controller 110, to perform a search operation on data of sequential access storage element 114 utilizing specified search attribute(s), and to responsively provide search result data to host data processing system 102 via communication channel 106 and storage controller 110. In one embodiment, the described search operation is performed on sequential access data storage media such as a removable data storage tape (not illustrated) of sequential access storage element 114.

While only a single sequential access storage element 114 (e.g., tape drive) has been depicted in the embodiment of FIG. 1, in other embodiments any number of random/direct access and/or sequential access storage elements may be provided within data storage subsystem 104. Operative coordination of such storage elements may be provided and/or controlled utilizing storage controller 110. In the illustrated embodiment of FIG. 1, storage controller 110 includes a search module 112, similar to that previously described with respect to sequential access storage element 114 and may additionally comprise a processor, sequencer, or other processing element or module (not illustrated) utilized to process I/O requests among associated storage elements. In embodiments where a data storage subsystem 104 including a single storage element is provided, storage controller 110 may be omitted from such a data storage subsystem if unnecessary. Moreover, while depicted as a portion of data storage subsystem 104, storage controller 110 may be provided as an external element or device.

Although search modules 112 and 116 may comprise software, hardware, or a combination thereof, in one embodiment of the present invention, search module 112 comprises a software element and search module 116 comprises a hardware element (e.g., a hardware processing element) which are used cooperatively to perform a search operation. In another embodiment, search modules 112 and 116 may be used alternatively, for example, based upon user selection or the detection of one or more predetermined conditions. In still other embodiments, a single search module may be provided within storage controller 110, sequential access storage element 114, or as an independent element or device.

Figure 2:
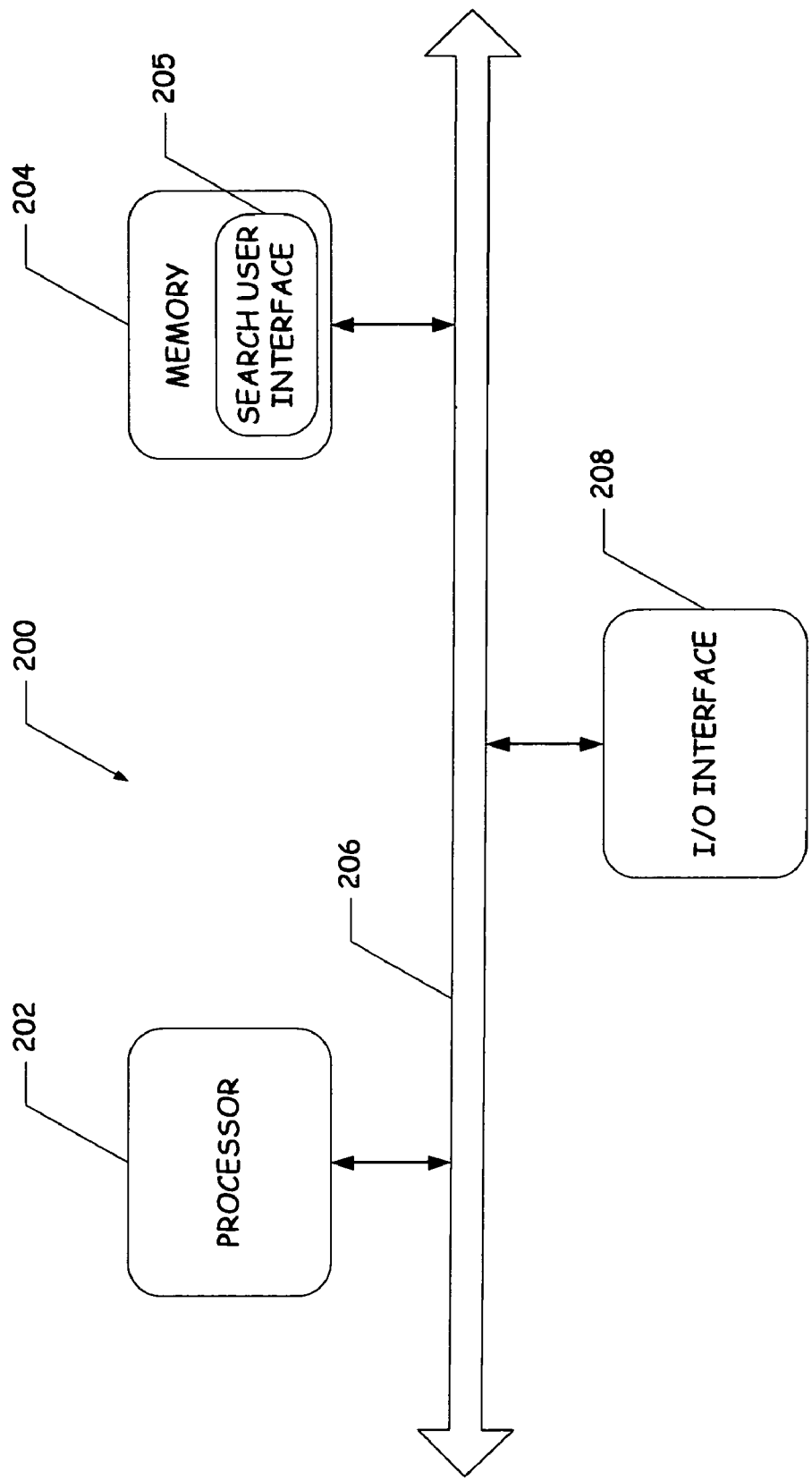
FIG. 2 illustrates a data processing system according to one or more embodiments of the present invention.

FIG. 2 illustrates a data processing system according to one or more embodiments of the present invention. For example, data processing system 200 as shown in FIG. 2 may illustrate a host data processing system as described herein. Alternatively and/or additionally a data processing system similar to that depicted in FIG. 2 may be used to implement a data storage subsystem or a component thereof. While a particular number and arrangement of elements have been illustrated with respect to data processing system 200 of FIG. 2, it should be appreciated that embodiments of the present invention are not limited to data processing systems having any particular number, type, or arrangement of components and so may encompass a wide variety of data processing system types, architectures, and form factors (e.g., network elements or nodes, personal computers, workstations, servers, or the like). Data processing system 200 of the illustrated embodiment includes a processor 202 coupled to a memory 204 utilizing a bus 206 or other communication medium. Memory 204 may comprise any of a number of system memory-type storage elements such as random access memory (RAM), read-only memory (ROM), flash memory, and cache. In the illustrated embodiment of FIG. 2, memory 204 includes a data storage subsystem search user interface 205 as described herein.

Data processing system 200 of the illustrated embodiment further comprises an input/output (I/O) interface 208 coupled to bus 206 to communicatively couple one or more I/O devices (not shown) to data processing system 200. Exemplary I/O devices may include traditional I/O devices such as keyboards, displays, printers, cursor control devices (e.g., trackballs, mice, tablets, etc.), speakers, and microphones; data storage elements and/or storage subsystems such as and/or including fixed or "hard" magnetic media storage devices, optical storage devices (e.g., CD or DVD ROMs), solid state storage elements (e.g., USB, Secure Digital SD™, CompactFlash™, MMC, or the like), removable magnetic medium storage elements such as floppy disks and tape, or other storage elements or mediums; and wired or wireless communication devices or media (e.g., communication networks accessed via modem or direct network interface).

Embodiments of the present invention may include software, information processing hardware, and various processing operations further described herein. The features and process operations of the present invention may be embodied in executable instructions embodied within a machine-readable medium such as memory 204, a storage element, a communication device or medium, or the like.

A machine-readable medium may include any mechanism that provides (i.e., stores and/or transmits) data in a form readable by a machine (e.g., data processing system 200). For example, a machine-readable medium includes but is not limited to: random access memory (RAM); read only memory (ROM); magnetic storage media; optical storage media; flash memory devices; electrical, optical, and/or acoustical propagated signals (e.g., carrier waves, infrared signals, digital signals, etc.); or the like.

The described executable instructions can be used to cause a general or special purpose processor such as processor 202, programmed with the instructions, to perform operations, methods or processes of the present invention. Alternatively, the features or operations of the present invention may be performed by specific hardware components that contain hard-wired logic for performing the operations, or by any combination of programmed data processing components and custom hardware components.

While embodiments of the present invention have been described in the context of fully functional data processing system; those skilled in the art will appreciate that such embodiments are capable of being distributed as a program product in a variety of forms and of being applied equally, regardless of the particular type of machine-readable or signal-bearing media used to carry out the distribution. Examples of signal-bearing media include recordable media such as floppy disks, tape, and CD-ROM, transmission type media such as digital and analog communications links, as well as media storage and distribution systems. Embodiments of the present invention may similarly be implemented using software modules used to perform certain operations or tasks. The described software modules may include script, batch, library, or other executable files and may be stored on a machine- or computer-readable medium. Thus, the modules may be stored within a computer system memory to configure a data processing or computer system to perform one or more functions of a software module. Various types of machine or computer-readable storage media as discussed herein may be used to store modules according to embodiments of the present invention.

Figure 3:
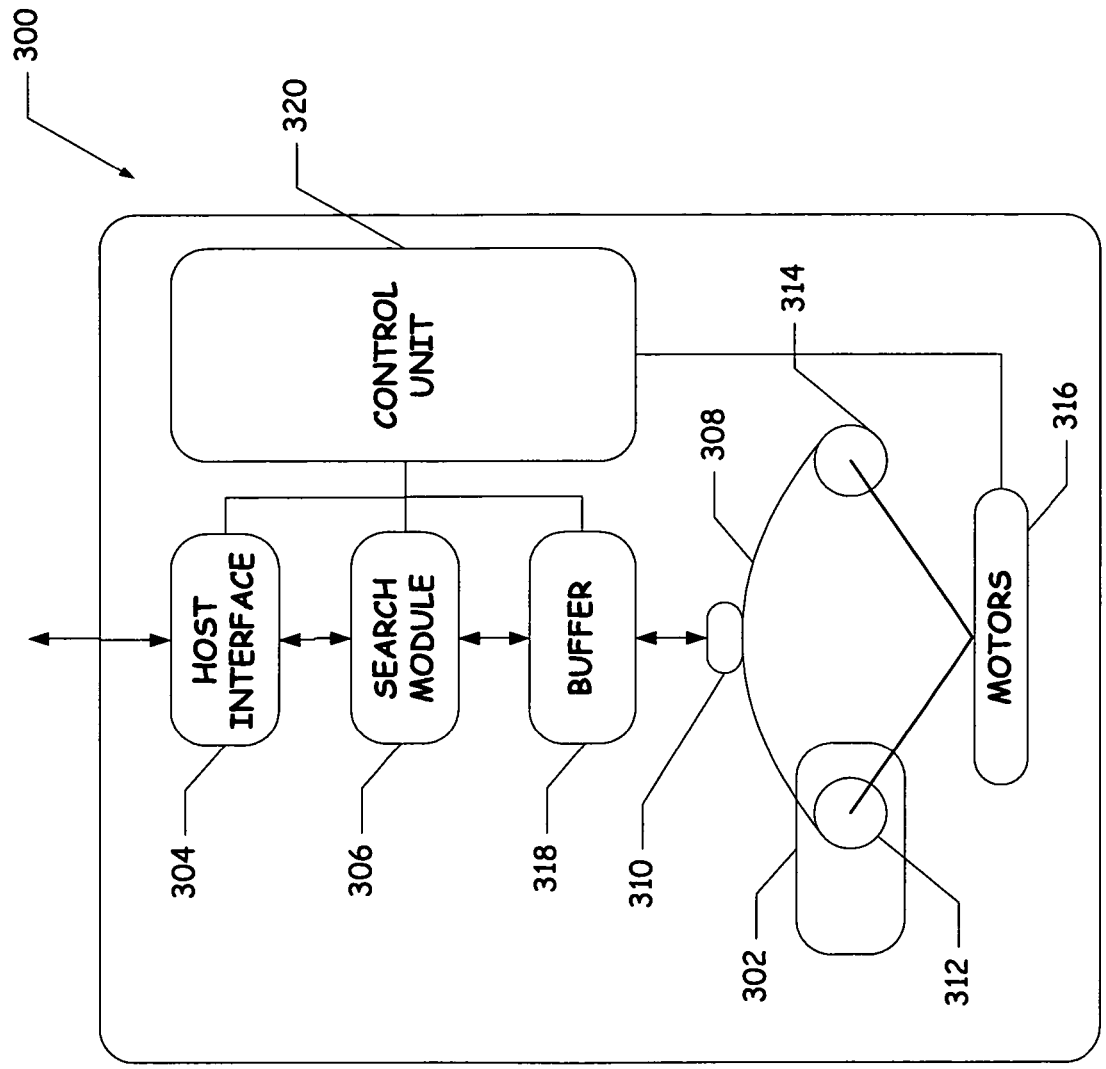
FIG. 3 illustrates a data storage subsystem according to an embodiment of the present invention.

FIG. 3 illustrates a data storage subsystem according to an embodiment of the present invention. In the embodiment of FIG. 3, data storage subsystem 300 comprises a sequential access storage element including sequential access data storage media (e.g., data storage tape cartridge 302, communication channel interface (e.g., host data processing system interface 304) to communicatively couple data storage subsystem 300 to a host data processing system via a communication channel (not illustrated) and a search module 306. In the illustrated embodiment of FIG. 3, search module 306 is configured to receive search attribute data which specifies at least one search attribute from a host data processing system via host data processing system interface 304, to perform a search operation on data of the sequential access storage element utilizing the received search attribute, and to responsively provide search result data to a host data processing system via host data processing system interface 304.

Data storage subsystem 300 of the illustrated embodiment further comprises tape data storage media 308 (e.g., magnetic tape) routed in proximity to a tape access (e.g., read/write) head 310 utilizing media transport reels 312 and 314 and one or more media transport motors 316 as shown. In the illustrated embodiment, tape access head 310 is configured to read data from and write data to tape data storage media 308 and to temporarily store or "stage" such data within a buffer 318 (e.g., one or more "read-ahead" or staging buffers). In the illustrated embodiment of FIG. 3, data storage subsystem 300 further comprises a controller or control unit 320. In one embodiment, control unit 320 controls and manages data flow, formatting, and data storage subsystem operation via control signals issued to one or more of host data processing system interface 304, search module 306, buffer 318, and/or media transport motors 316 as shown. In another embodiment, functionality provided by search module 306 may be incorporated into or integrated with control unit 320.

Figure 4:
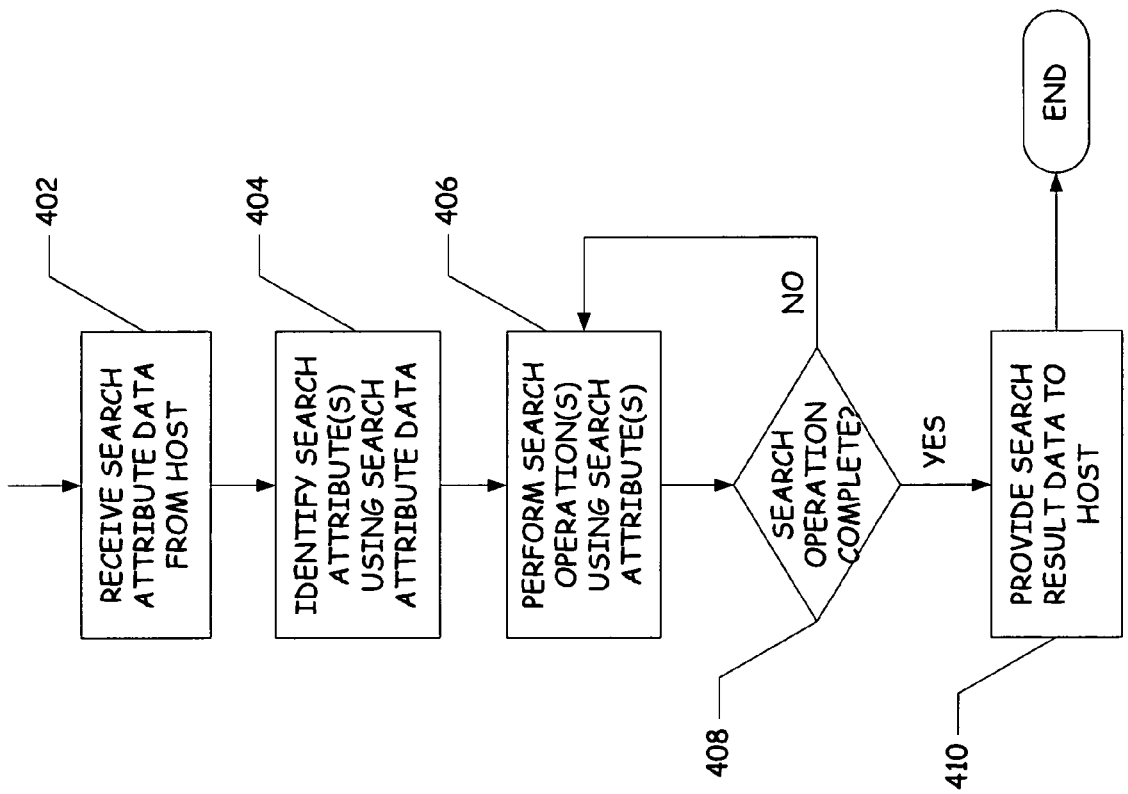
FIG. 4 illustrates a high-level flow diagram of a data storage subsystem search process according to an embodiment of the present invention.

FIG. 4 illustrates a high-level flow diagram of a data storage subsystem search process according to an embodiment of the present invention. In the illustrated embodiment, search attribute data is initially received from a host data processing system (process block 402). Thereafter, one or more user-specified search attributes are identified within and utilizing the received search attribute data (process block 404). Once identified, each user-specified search attribute (as well as one or more default search attributes in one embodiment) are utilized to perform one or more search operations as described herein (process block 406).

As a requested search operation is being performed, a determination is made whether the requested operation has completed (process block 408). A search operation may be indicated as complete for any of a variety of reason in the depicted embodiment. For example, where requested search result data is provided (e.g., a "next" specified search term occurrence is identified within associated data of a sequential access data storage element), a "limit condition"-type search attributes is reached/detected, or no occurrences of a specified search term are identified within a sequential access storage element to be searched. Once a determination is made that a requested search operation has completed, search result data, if any, is provided to an associated host data processing system. (process block 410).

Figure 5:
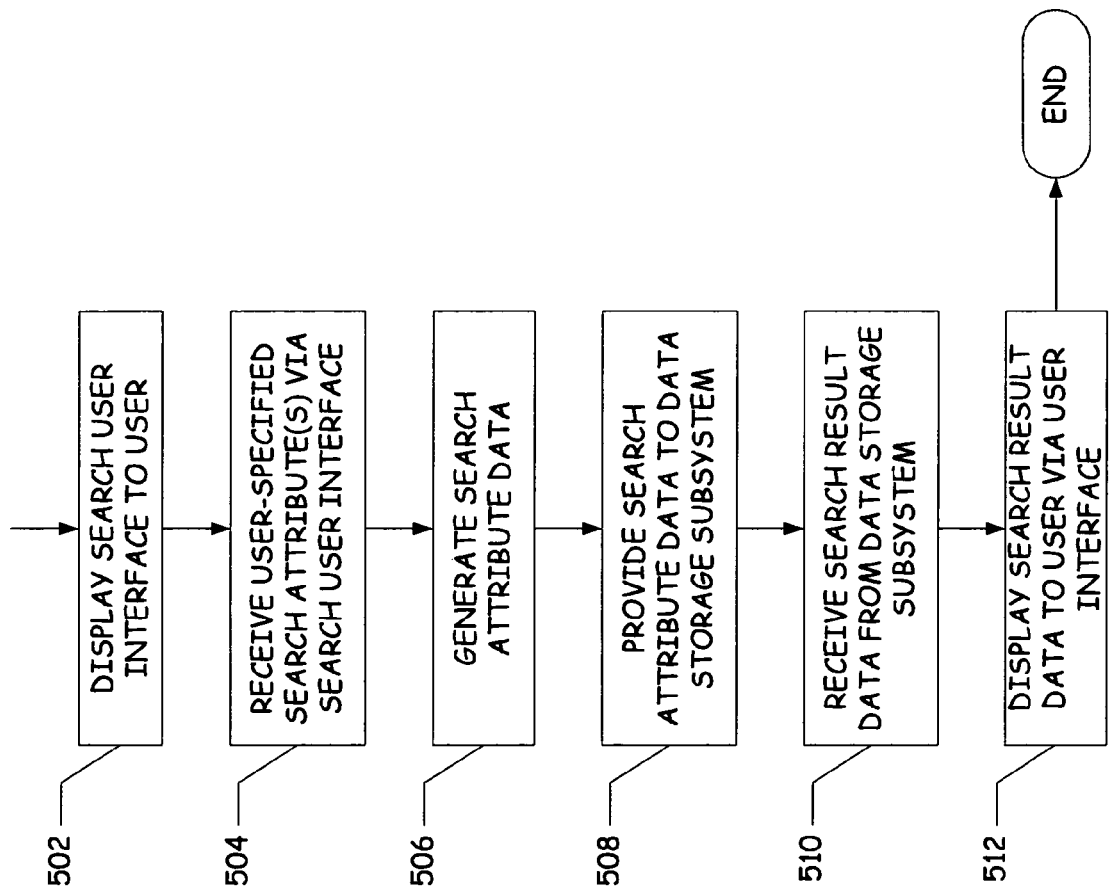
FIG. 5 illustrates a high-level flow diagram of a host data processing system search process according to an embodiment of the present invention.

FIG. 5 illustrates a high-level flow diagram of a host data processing system search process according to an embodiment of the present invention. In the illustrated process embodiment, a data storage subsystem search user interface is initially presented to a host data processing system user (process block 502). Thereafter, one or more user-selected and specified search attributes are received via the described user interface (process block 504) and search attribute data is generated using the specified attributes (process block 506). Once generated, the described search attribute data (and in at least one embodiment, metadata indicating which of a number of search attributes have been user-specified using the search attribute data) is provided to a search module of a data storage subsystem (process block 508).

Thereafter in the depicted process embodiment, search result data specifying search results and/or search term occurrences is received from a data storage subsystem (process block 510). Received search results of the search result data are then presented via the described user interface (process block 512) as shown.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Consequently, the invention is intended to be limited only by the scope of the appended claims, giving full cognizance to equivalents in all respects.

What is claimed is:

1. A data storage subsystem comprising:
a communication channel interface to communicatively couple said data storage subsystem to a host data processing system via a communication channel; and
a search module to receive search attribute data from said host data processing system via said communication channel interface, wherein said search attribute data specifies a search attribute, to perform a search operation on data of a sequential access storage element utilizing said search attribute, and to provide search result data to said host data processing system via said communication channel interface in response to a performance of said search operation.

2. The data storage subsystem of claim 1, wherein
said search attribute data specifies a maximum search time duration, and
said search module is configured to perform said search operation for a time period less than or equal to said maximum search time duration.

3. The data storage subsystem of claim 1, wherein
said search attribute data specifies a maximum number of logical blocks,
said data of said sequential access storage element is stored utilizing a plurality of logical blocks, and
said search module is configured to perform said search operation on a number of logical blocks of said plurality of logical blocks which is less than or equal to said maximum number of logical blocks.

4. The data storage subsystem of claim 3, wherein
said search result data comprises data which specifies a logical block of said plurality of logical blocks.

5. The data storage subsystem of claim 3, wherein
said search module ceases to perform said search operation once a final logical block of an entire sequential access storage element has been searched.

6. The data storage subsystem of claim 1, wherein
said search attribute data specifies a search term and a sequential search type,
said search operation is associated with a current logical position within said data of said sequential access storage element,
said search module is configured to provide data which specifies an occurrence of said search term within said data of said sequential access storage element, and
said occurrence of said search term is sequentially adjacent to said current logical position.

7. The data storage subsystem of claim 1, wherein
said search attribute data specifies a search term and a summary search type, and
said search module is configured to provide data which specifies one or more occurrences of said search term within said data of said sequential access storage element.

8. The data storage subsystem of claim 7, wherein
said search attribute data further specifies a maximum number of search results, and
said search module is configured to provide data which specifies a number of occurrences of said search term within said data of said sequential access storage element which is less than or equal to said maximum number of search results.

9. The data storage subsystem of claim 1, wherein
said search attribute data specifies a search term,
said search operation comprises a passive search operation, and
said search module is configured to perform said passive search operation in response to a receipt of a request to perform an input/output operation on said sequential access storage element, and further configured to provide first data which specifies an occurrence of said search term within said data of said sequential access storage element and second data which specifies a response to said request to perform said input/output operation.

10. The data storage subsystem of claim 9, wherein
said data storage subsystem further comprises a buffer storage element to store a portion of said data of said sequential access storage element in response to said receipt of said request to perform said input/output operation, and
said search module is configured to perform said passive search operation on said portion of said data of said sequential access storage element stored within said buffer storage element.

11. The data storage subsystem of claim 1, wherein
said search module is configured to perform an active search operation in response to a receipt of a request to perform said active search operation on said data of said sequential access storage element.

12. The data storage subsystem of claim 1, wherein
said search module comprises a hardware processing element,
said search module is configured to perform a primary search operation on said data of said sequential access storage element utilizing said hardware processing element and to provide said search result data to search module software within said host data processing system, and
said search module software is configured to perform a secondary search operation utilizing said search result data.

13. The data storage subsystem of claim 12, wherein
said secondary search operation utilizing said search result data is performed locally on said host data processing system in response to receipt of said search result data from said search module.

14. The data storage subsystem of claim 1, wherein
said search attribute data specifies a user-selected search attribute, and
said search module is configured to perform said search operation utilizing said user-selected search attribute and at least one default search attribute.

15. A method comprising:
receiving search attribute data at a datastorage subsystem from a host data processing system, wherein
    said search attribute data specifies a search attribute, and
    said data storage subsystem comprises a search module and a sequential access storage element;
performing a search operation utilizing said search module in response to a receipt of said search attribute data; wherein said performing comprises
    performing said search operation on data of said sequential access storage element utilizing said search attribute; and
providing search result data from said data storage subsystem to said host data processing system in response to a performance of said search operation.

16. The method of claim 15, wherein
said search attribute data specifies a maximum search time duration, and
performing said search operation comprises performing said search operation for a time period less than or equal to said maximum search time duration.

17. The method of claim 15, wherein
said search attribute data specifies a user-selected search attribute, and
performing said search operation comprises performing said search operation utilizing said user-selected search attribute and at least one default search attribute.

18. The method of claim 15, wherein
said search attribute data specifies a search term and a sequential search type,
Said search operation is associated with a current logical position within said data of said sequential access storage element,
providing said search result data comprises providing data which specifies an occurrence of said search term within said data of said sequential access storage element, and
said occurrence of said search term is sequentially adjacent to said current logical position.

19. The method of claim 15, wherein
said search attribute data specifies a search term,
said data storage subsystem further comprises a buffer storage element,
said method further comprises causing a portion of said data of said sequential access storage element to be stored within said buffer storage element in response to a receipt of a request to perform an input/output operation on said sequential access storage element,
performing said search operation comprises performing a passive search operation on said portion of said data of said sequential access storage element stored within said buffer storage element in response to said receipt of said request to perform said input/output operation, and
providing said search result data comprises providing first data which specifies an occurrence of said search term within said data of said sequential access storage element and second data which specifies a response to said request to perform said input/output operation.

20. The method of claim 15, wherein
said search module comprises a hardware processing element,
performing said search operation comprises performing a primary search operation on said data of said sequential access storage element utilizing said hardware processing element,
providing said search result data comprises providing said search result data to search module software within said host data processing system which is configured to perform a secondary search operation.

21. An apparatus comprising:
means for receiving search attribute data at a data storage subsystem from a host data processing system, wherein
    said search attribute data specifies a search attribute, and
    said data storage subsystem comprises a search module and a sequential access storage element;
means for performing a search operation utilizing said search module in response to a receipt of said search attribute data; wherein said means for performing comprises
    means for performing said search operation on data of said sequential access storage element utilizing said search attribute; and
means for providing search result data from said data storage subsystem to said host data processing system in response to a performance of said search operation.

22. The apparatus of claim 21, wherein
said search attribute data specifies a maximum search time duration, and
said means for performing said search operation comprises means for performing said search operation for a time period less than or equal to said maximum search time duration.

23. The apparatus of claim 21, wherein
said search attribute data specifies a user-selected search attribute, and
said means for performing said search operation comprises means for performing said search operation utilizing said user-selected search attribute and at least one default search attribute.

24. The apparatus of claim 21, wherein
said search attribute data specifies a search term and a sequential search type,
said search operation is with a current logical position within said data of said sequential access storage element,
said means for providing said search result data comprises means for providing data which specifies an occurrence of said search term within said data of said sequential access storage element, and
said occurrence of said search term is sequentially adjacent to said current logical position.

25. The apparatus of claim 21, wherein
said search attribute data specifies a search term,
said data storage subsystem further comprises a buffer storage element,
said apparatus further comprises means for causing a portion of said data of said sequential access storage element to be stored within said butler storage element in response to a receipt of a request to perform an input/output operation on said sequential access storage element,
said means for performing said search operation comprises means for performing a passive search operation on said portion of said data of said sequential access storage element stored within said buffer storage element in response to said receipt of said request to perform said input/output operation, and said means for providing said search result data comprises means for providing first data which specifies an occurrence of said search term within said data of said sequential access storage element and second data which specifies a response to said request to perform said input/output operation.

26. The apparatus of claim 21, wherein said search module comprises a hardware processing element, said means for performing said search operation comprises means for performing a primary search operation on said data of said sequential access storage element utilizing said hardware processing element, said means for providing said search result data comprises means for providing said search result data to search module software within said host data processing system which is configured to perform a secondary search operation.

27. A machine-readable medium having a plurality of instructions executable by a machine embodied therein, wherein said plurality of instructions when executed cause said machine to perform a method comprising:

receiving search attribute data at a data storage subsystem from a host data processing system, wherein
said search attribute data specifies a search attribute, and
said data storage subsystem comprises a search module and a sequential access storage element;

performing a search operation utilizing said search module in response to a receipt of said search attribute data; wherein said performing comprises
performing said search operation on data of said sequential access storage element utilizing said search attribute; and providing search result data from said data storage subsystem to said host data processing system in response to a performance of said search operation.

28. The machine-readable medium of claim 27, wherein said search attribute data specifies a maximum search time duration, and performing said search operation comprises performing said search operation for a time period less than or equal to said maximum search time duration.

29. The machine-readable medium of claim 27, wherein said search attribute data specifies a user-selected search attribute, and performing said search operation comprises performing said search operation utilizing said user-selected search attribute and at least one default search attribute.

30. The machine-readable medium of claim 27, wherein said search attribute data specifies a search term and a sequential search type, said search operation is associated with a current logical position within said data of said sequential access storage element, providing said search result data comprises providing data which specifies an occurrence of said search term within said data of said sequential access storage element, and said occurrence of said search term is sequentially adjacent to said current logical position.

31. The machine-readable medium of claim 27, wherein said search attribute data specifies a search term, said data storage subsystem further comprises a buffer storage element, said method further comprises causing a portion of said data of said sequential access storage element to be stored within said buffer storage element in response to a receipt of a request to perform an input/output operation on said sequential access storage element, performing said search operation comprises performing a passive search operation on said portion of said data of said sequential access storage element stored within said buffer storage element in response to said receipt of said request to perform said input/output operation, and providing said search result data comprises providing first data which specifies an occurrence of said search term within said data of said sequential access storage element and second data which specifies a response to said request to perform said input/output operation.

32. The machine-readable medium of claim 27, wherein said search module comprises a hardware processing element, performing said search operation comprises performing a primary search operation on said data of said sequential access storage element utilizing said hardware processing element, providing said search result data comprises providing said search result data to search module software within said host data processing system which is configured to perform a secondary search operation.

33. A method comprising:

presenting a data storage subsystem search user interface at a host data processing system;

receiving search attribute data from a user via said data storage subsystem search user interface;

providing said search attribute data to a data storage subsystem, wherein said data storage subsystem comprises a search module and a sequential access storage element; and receiving search result data from said data storage subsystem in response to a provision of said search attribute data to said data storage subsystem.

34. The method of claim 33, wherein receiving search attribute data comprises receiving data which specifies a maximum search time duration.

35. The method of claim 33, wherein receiving search attribute data comprises receiving data which specifies a maximum number of logical blocks to be searched.

36. The method of claim 33, wherein receiving search attribute data comprises receiving data which specifies a maximum number search results to provide via said data storage subsystem search user interface.

37. The method of claim 33, wherein said search module comprises a hardware processing element, said search module is configured to perform a primary search operation on data of said sequential access storage element utilizing said hardware processing element, and said method further comprises performing a secondary search operation on said search result data utilizing search module software at said host data processing system.

38. A data storage subsystem comprising:

a communication channel interface to communicatively couple said data storage subsystem to a host data processing system via a communication channel;

a search module to receive search attribute data from said host data processing system via said communication channel interface, wherein said search attribute data specifies a search attribute, to perform a search operation on data of a sequential access storage element utilizing said search attribute, and to provide search result data to said host data processing system via said communication channel interface in response to a performance of said search operation; wherein said search attribute data specifies a maximum number of logical blocks, said data of said sequential access storage element is stored utilizing a plurality of logical blocks, said search module is configured to perform said search operation on a number of logical blocks of said plurality of logical blocks which is less than or equal to said maximum number of logical blocks, said search module ceases to perform said search operation once a final logical block of an entire sequential access storage element has been searched, said search attribute data specifies a user-selected search attribute, said search module is configured to perform said search operation utilizing said user-selected search attribute and at least one default search attribute, said search attribute data specifies a search term and a sequential search type, said search operation is associated with a current logical position within said data of said sequential access storage element, said search module is configured to provide data which specifies an occurrence of said search term within said data of said sequential access storage element, and said occurrence of said search term is sequentially adjacent to said current logical position.

* * * * *